(12) United States Patent
Harui (10) Patent No.: US 6,886,516 B2
(45) Date of Patent: May 3, 2005

(54) CYLINDER HEAD OF INTERNAL COMBUSTION ENGINE AND METHOD OF PRODUCING SAME

(75) Inventor: Jun Harui, Tokyo (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/713,356

(22) Filed: Nov. 17, 2003

(65) Prior Publication Data

US 2004/0118379 A1 Jun. 24, 2004

(30) Foreign Application Priority Data

Dec. 20, 2002 (JP) ........................................ 2002-370766

(51) Int. Cl.[7] .............................. F02B 31/00; F02F 1/42
(52) U.S. Cl. ................ 123/184.52; 123/306; 123/193.5
(58) Field of Search ........................ 123/184.52, 184.37, 123/184.45, 306, 308, 432, 193.5

(56) References Cited

U.S. PATENT DOCUMENTS

| | | | | |
|---|---|---|---|---|
| 3,861,376 A | * | 1/1975 | Ashley ........................ | 123/657 |
| 4,347,816 A | * | 9/1982 | Saito et al. ................. | 123/308 |
| 4,641,620 A | * | 2/1987 | Yoshimura et al. ......... | 123/432 |
| 5,186,139 A | * | 2/1993 | Matsura ...................... | 123/301 |
| 5,632,244 A | | 5/1997 | Endres et al. | |
| 6,478,008 B2 | * | 11/2002 | Wolters ...................... | 123/306 |
| 2002/0078921 A1 | | 6/2002 | Kim et al. | |

FOREIGN PATENT DOCUMENTS

| | | |
|---|---|---|
| DE | 198 03 867 A1 | 8/1999 |
| JP | 6-66148 A | 3/1994 |
| JP | 2001-193469 A | 7/2001 |

* cited by examiner

*Primary Examiner*—Marguerite McMahon
(74) *Attorney, Agent, or Firm*—Foley & Lardner LLP

(57) ABSTRACT

A cylinder head of an internal combustion engine comprises a structure cast in metal, the structure defining therein an intake port and having a side wall surface from which an upstream end of the intake port is exposed to the outside; and a partition plate of metal installed in the intake port to divide the same into two parallel intake conduits, the partition plate having lateral edges which are embedded in an inner wall of the intake port. The partition plate has an upstream edge which includes a major straight portion and two projected end portions which are provided on both ends of the major straight portion respectively, and the major straight portion is positioned inside relative to the side wall surface and the two projected end portions have upstream edges which are embedded in the inner wall of the intake port and machined to be flush with the side wall surface.

12 Claims, 7 Drawing Sheets

CYLINDER HEAD OF INTERNAL COMBUSTION ENGINE AND METHOD OF PRODUCING SAME

BACKGROUND OF THE INVENTION

1. Field of the Invention

The present invention relates in general to cylinder heads of an internal combustion engine and a method of producing the same, and more particularly to the cylinder heads of a type that has, in an intake port thereof, a partition plate to divide the intake port into two parallel intake conduits, and a method of producing the cylinder head.

2. Description of the Related Art

In order to clarify the task of the present invention, one of the cylinder heads of the above-mentioned type will be briefly discussed in the following, which is shown in Japanese Laid-open Patent Application (Tokkai) 2001-193469.

That is, the cylinder head disclosed by the publication has an intake port that is constructed to enhance a tumbling flow of an intake air led to a cylinder of an internal combustion engine. For this tumbling flow enhancement, the publication shows a partition plate that is installed in the intake port to divide the same into a pair of parallel intake conduits. The partition plate is tightly set in the intake port through a casting-in technique using the partition plate as an insert. That is, before a casting stage of the cylinder head, the partition plate is set in a core sand that is used for shaping the intake port of the cylinder head to be produced. The partition plate used is a corrugated metal plate for avoiding a deformation of the partition plate caused by an inevitable thermal expansion of the same that would occur at the casting stage of the cylinder head.

SUMMARY OF THE INVENTION

After examining the cylinder head of the publication, it has been found that although the corrugated partition plate can exhibit a sufficient absorbing against a thermal expansion in a radial direction of the intake port, it fails to exhibit a satisfied absorbing against a thermal expansion in an axial direction of the intake port. This insufficient expansion absorbing in the axial direction tends to induce production of cracks in a downstream part of the core sand at the casting stage of the cylinder head, and thus bring about production of undesired casting fins on the downstream edge of the partition plate.

Usually, the downstream edge of the partition plate is positioned in a deep zone of the intake port. As is known, removing the casting fins from such downstream edge needs a troublesome and time-consumed work.

It is therefore an object of the present invention to provide a cylinder head of an internal combustion engine and a method of producing the same, which are free of the above-mentioned drawbacks.

According to a first aspect the present invention, there is provided a cylinder head of an internal combustion engine, which comprises a structure cast in metal, the structure defining therein an intake port and having a side wall surface from which an upstream end of the intake port is exposed to the outside; and a partition plate of metal installed in the intake port to divide the same into two parallel intake conduits, the partition plate having lateral edges which are embedded in an inner wall of the intake port, wherein the partition plate has an upstream edge which includes a major straight portion and two projected end portions which are provided on both ends of the major straight portion respectively, and wherein the major straight portion is positioned inside relative to the side wall surface and the two projected end portions have upstream edges which are embedded in the inner wall of the intake port and machined to be flush with the side wall surface.

According to a second aspect of the present invention, there is provided a method of producing a cast cylinder head of an internal combustion engine, the cylinder head having an intake port and a side wall surface from which an upstream end of the intake port is exposed to the outside, the method comprising (a) preparing a sand core for shaping the intake port, the sand core having a partition plate set therein, the partition plate including a major portion wholly embedded in the sand core, lateral edges projected from lateral edges of the core sand, a downstream edge and an upstream edge, the upstream edge including a major straight portion and two projected end portions which are provided at both ends of the major straight portion; (b) setting the sand core in a sand mold in such a manner that the major straight portion is positioned inside of the side wall surface of a cylinder head to be produced and the two projected end portions are projected outward from the side wall surface of the cylinder head to be produced; (c) positioning the sand core relative to a core print possessed by the sand mold; (d) pouring a molten metal into the sand core and removing a produced cylinder head from the sand mold after solidification of the molten metal; and (e) trimming the two projected end portions of the partition plate in the produced cylinder head in order that upstream edges of the two projected end portions are flush with the side wall surface of the produced cylinder head.

BRIEF DESCRIPTION OF THE DRAWINGS

FIGS. 2A and 2B are sectional views taken along the line "II—II" of FIG. 1, in which

FIGS. 6A-1, 6A-2 and 6A-3 are sketches depicting one measure A discussed by the inventor;

FIGS. 6B-1, 6B-2 and 6B-3 are sketches depicting another measure B discussed by the inventor;

FIGS. 7A-1, 7A-2, 7A-3 and 7B are sketches depicting a measure thought out by the inventor.

DETAILED DESCRIPTION OF THE EMBODIMENTS

In the following, the present invention will be described in detail with reference to the accompanying drawings.

For ease of understanding, various directional terms such as right, left, upper, lower and the like are used in the following description. However, such terms are to be understood with respect to only a drawing or drawings on which a corresponding part or portion is shown.

Figure 1:
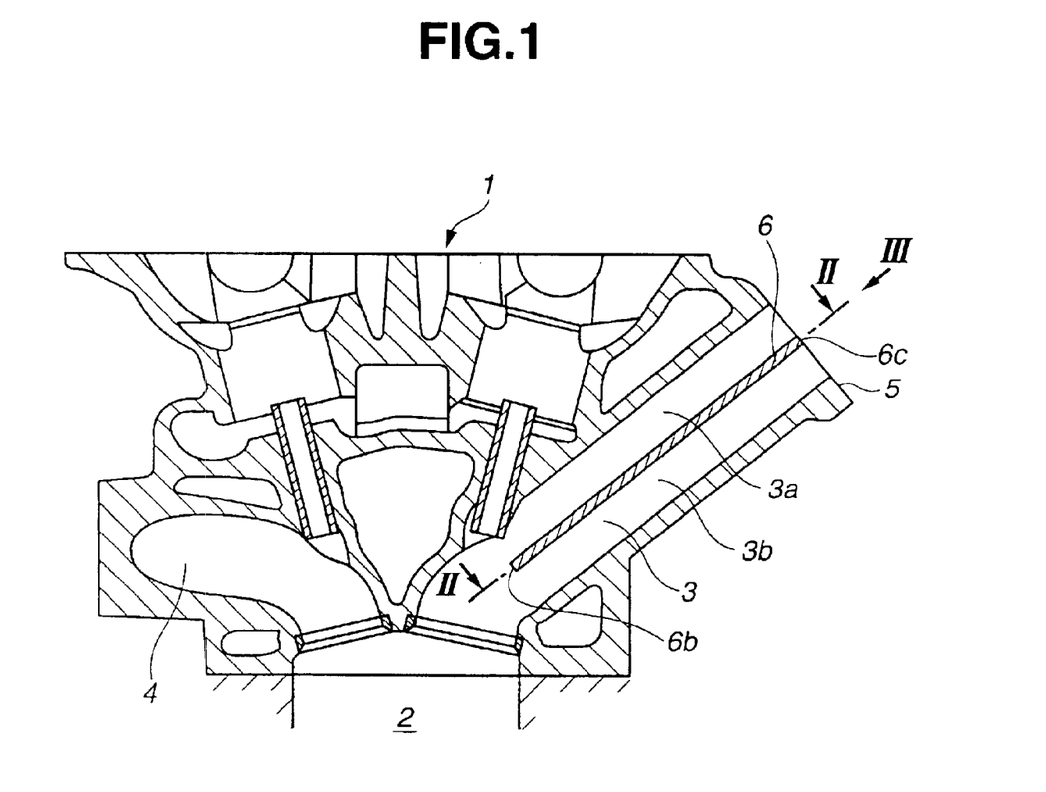
FIG. 1 is a sectional view of a cylinder head to which the present invention is practically applied.
Figures 2A, 2B:
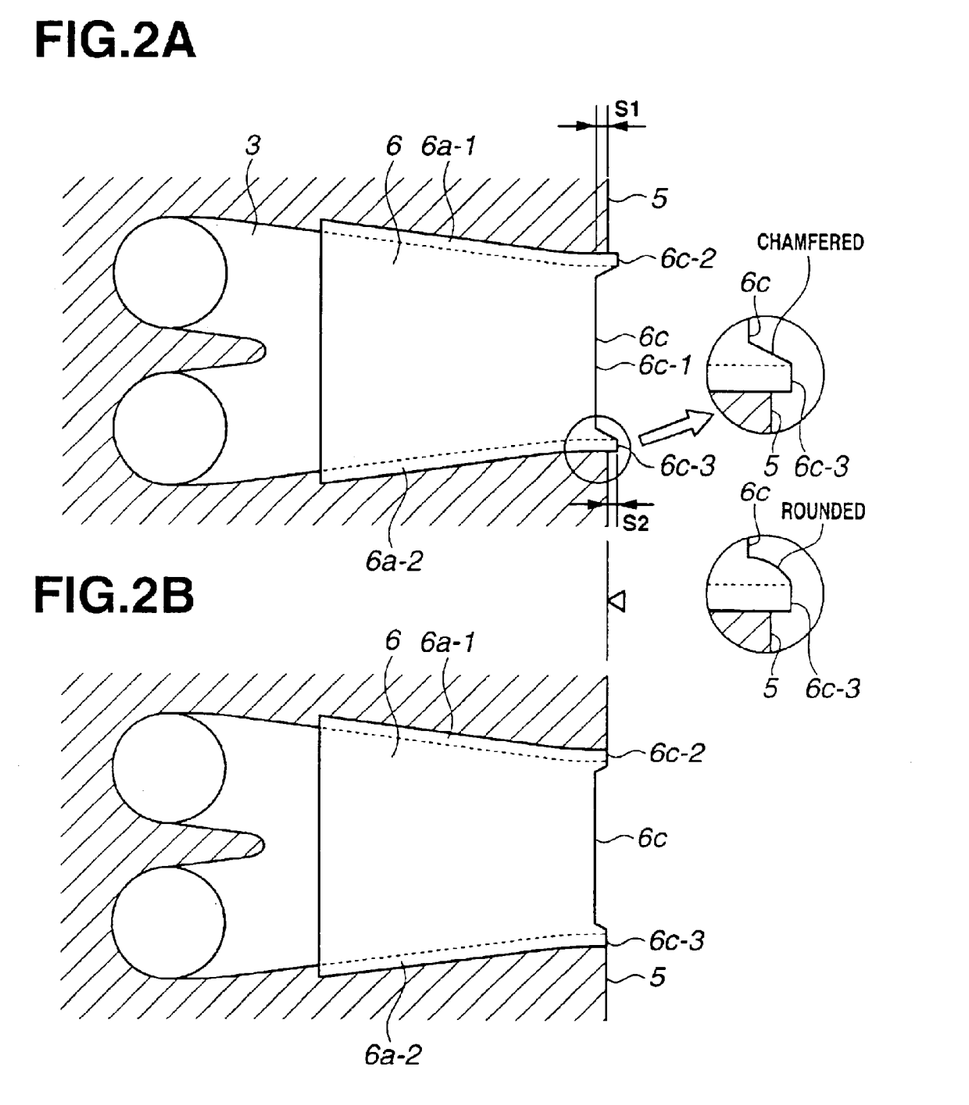
FIG. 2A is a view taken just after completion of casting of the cylinder head.
FIG. 2B is a view taken after machining the produced cylinder head.
Figure 3:
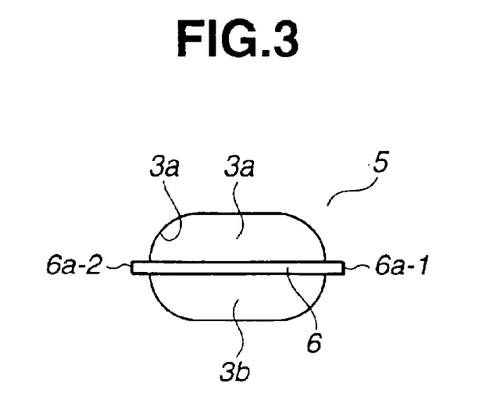
FIG. 3 is a view taken from a direction of the arrow "III" of FIG. 1, showing a partition plate set in an intake port of the cylinder head.

Referring to FIGS. 1 to 3, particularly FIG. 1, there is shown a cylinder head 1 of an internal combustion engine, to which the present invention is practically applied.

Cylinder head 1 is constructed of a cast aluminum alloy. Cylinder head 1 has a bore that forms an upper portion of a cylinder 2, the bore thus constituting part of a combustion chamber. Cylinder head 1 has further intake and exhaust ports 3 and 4 which are connected at their lower ends to the interior of cylinder 2.

As is seen from FIG. 2A, intake port 3 is of a so-called siamesed type which comprises two separated downstream portions that are exposed to the interior of cylinder 2 through respective intake valves (not shown) and a united upstream portion where upstream portions of the separated downstream portions are united.

As is seen from FIG. 3, the united upstream portion of intake port 3 has an oval cross section with its larger lateral dimension and its smaller vertical dimension. The oval upstream portion is exposed to the outside of cylinder head 1 at a side wall surface 5 of cylinder head 1.

As is best seen from FIGS. 1 and 2A, within the united upstream portion of intake port 3, there is installed a generally trapezoidal partition plate 6 which extends axially in the upstream portion to divide the same into upper and lower parallel intake conduits 3a and 3b (see FIG. 3). Partition plate 6 is constructed of an aluminum alloy, a stainless steel or the like. If partition plate 6 is constructed of aluminum alloy, it should have a higher strength than that used for cylinder head 1.

Although not shown in FIG. 1, lower intake conduit 3b has a tumble control valve that functions to open and close conduit 3b. That is, when the tumble control valve closes lower intake conduit 3b causing only upper intake conduit 3a to open, a tumble flow of air running in intake port 3 is enhanced. Due to this enhanced tumble air flow, the fuel consumption rate of the engine is improved.

Like in case of the above-mentioned publication, partition plate 6 is tightly set in intake port 3 of cylinder head 1 through casting-in technique. That is, before casting a molten metal into a sand mold for producing cylinder head 1, a cylindrical core sand 10 (see FIGS. 4A and 4B) having partition plate 6 set therein is prepared, which is shaped to form intake port 3 of cylinder head 1 to be produced.

Figure 4A:
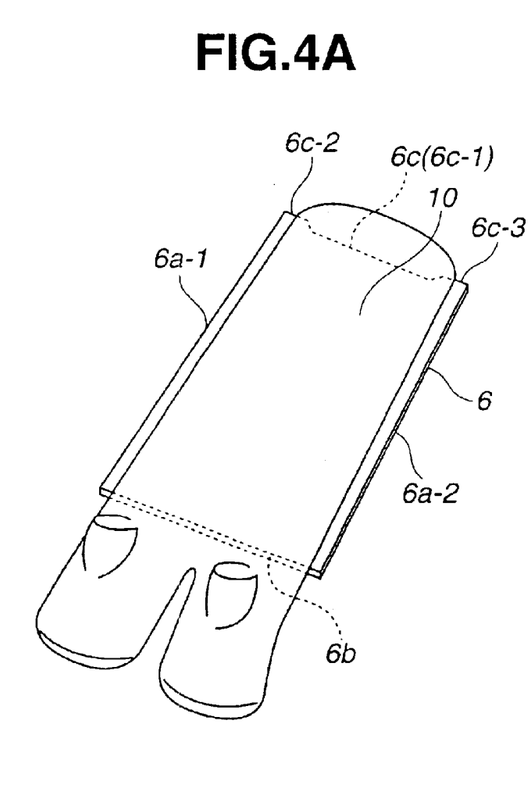
FIG. 4A is a perspective view of a cylindrical core sand used for forming an intake port.
Figure 4B:
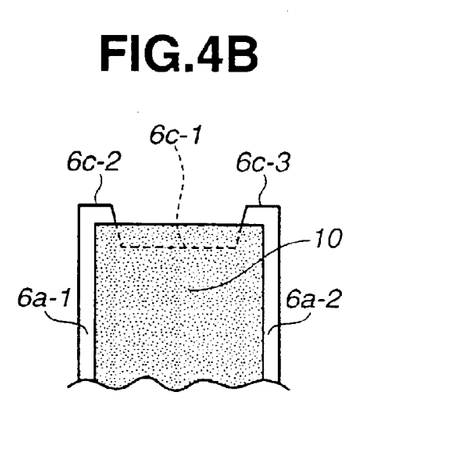
FIG. 4B is a partial plan view of the core sand shown in FIG. 4A.

As is seen from FIGS. 4A and 4B, partition plate 6 is set in a given position of core sand 10. As shown, upon setting, lateral edges 6a-1 and 6a-2 of partition plate 6 are exposed to the outside or projected from lateral edges of core sand 10. Thus, upon completion of casting of cylinder head 1, lateral edges 6a and 6a of partition plate 6 are embedded in a cylindrical inner surface of intake port 3 formed in the produced cylinder head 1.

With the above-mentioned method, partition plate 6 is tightly fixed to intake port 3 of cylinder head 1. Because both edges 6a-1 and 61-2 of partition plate 6 are tightly supported by cylinder head 1, the thickness of partition plate 6 can be reduced to a sufficiently small level, for example, 1 to 2 mm, which brings about a reduction in air-flow resistance possessed by partition plate 6. Besides, due to employment of the both edge supporting measure, partition plate 6 can be constructed of a material, such as duralumin, stainless steel or the like, that is different from the aluminum alloy of cylinder head 1. Furthermore, since there is no need of preparing a separate member through which partition plate 6 is connected to cylinder head 1, cost reduction of cylinder head 1 is achieved.

As is seen from FIG. 2A that shows a sectional view of the produced cylinder head 1 at a position where intake port 3 is formed, trapezoidal partition plate 6 set in intake port 3 comprises a major portion (no numeral), the above-mentioned lateral edges 6a-1 and 6a-2, a longer downstream edge 6b and a shorter upstream edge 6c.

As shown, shorter upstream edge 6c comprises a major straight portion 6c-1 which is positioned inside relative to the side wall surface 5 of cylinder head 1 and two projected end portions 6c-2 and 6c-3 which are positioned outside relative to the side wall surface 5. In other words, major straight portion 6c-1 is positioned within a range indicated by reference S1, and projected end portions 6c-2 and 6c-3 are positioned within a range indicated by reference S2.

As is seen from the circled views provided beside FIG. 2A, projected end portions 6c-2 and 6c-3 have each corner portions chamfered or rounded.

As will be seen from FIG. 2B, in the present invention, projected end portions 6c-2 and 6c-3 are thereafter trimmed or machined to become flush with the side wall surface 5 of the produced cylinder head 1.

In the following, reasons for adopting the above-mentioned arrangement of partition plate 6 in cylinder head 1 will be described with the aid of the accompanying drawings.

Figure 5A:
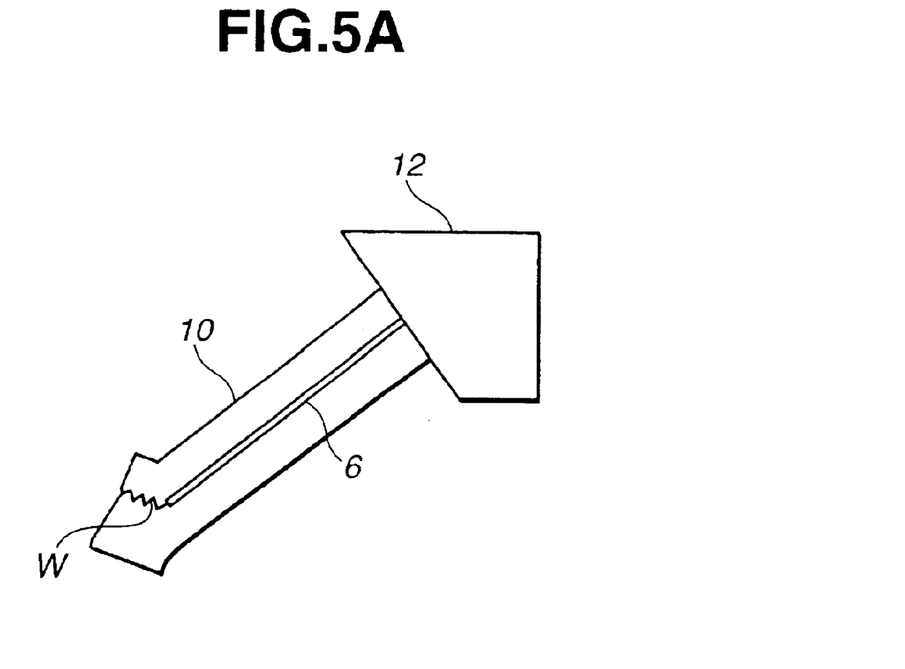
FIGS. 5A and 5B are schematic views of conventional core sands, showing cracks formed thereon.

As is seen from FIG. 5A, when core sand 10 having partition plate 6 set therein (see FIG. 4A) is subjected to a casting for producing cylinder head 1, it tends to occur that, due to a differential thermal expansion between core sand 10 and partition plate 6, core sand 10 has cracks W. In fact, partition plate 6 has a higher thermal expansion than core sand 10. If such cracks W are produced, a molten metal (viz., molten aluminum alloy) penetrates into the cracks W and thus, after completion of the casting, the casting fins are left on downstream edge 6b of partition plate 6.

Theoretically, such cracks W of core sand 10 are expected to appear at axially both edges 6b and 6c of partition plate 6. However, because the downstream part of the core sand 10 that is positioned close to a cylinder to be produced has a smaller cross section and the upstream part of the core sand 10 that is positioned close to the side wall surface 5 of cylinder head 1 to be produced has a larger cross section and is supported by a core print 12, such cracks W usually appear at the downstream part.

In intake port 3 of cylinder head 1 thus produced, the casting fins formed on downstream edge 6b of partition plate 6 have a marked influence on an air intake performance of intake port 3. Of course, this drawback may be solved by cutting or removing the casting fins. However, as is easily understood when referring to FIG. 1, it is very difficult and at least troublesome to cut such casting fins from the downstream edge 6b because the downstream edge 6b of partition plate 6 is positioned inside of intake port 3.

Figure 5B:
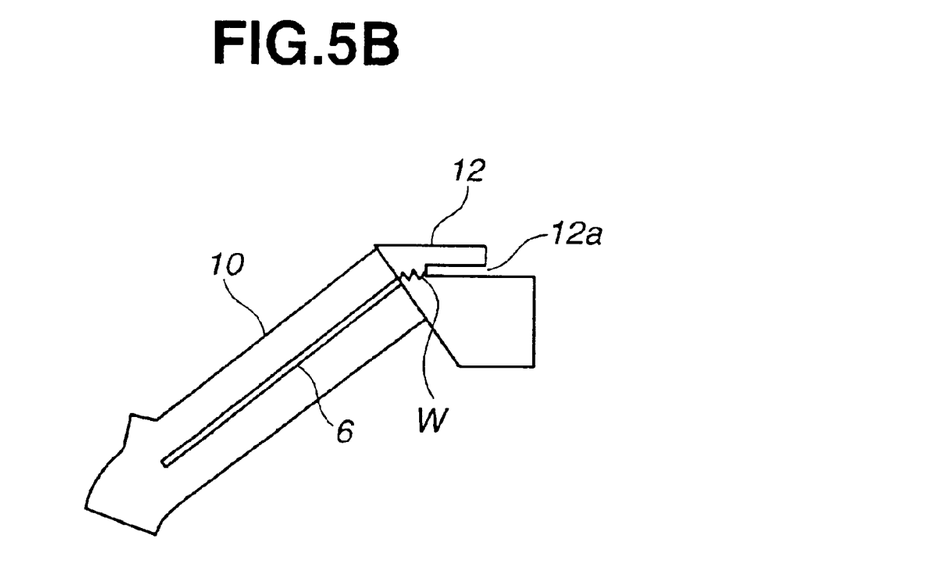

If, as is seen from FIG. 5B, core print 12 is constructed to have a cut 12a to allow the upstream part of core sand 10 to have a smaller cross section, such cracks W may appear at the upstream part. If the cracks W appear at the upstream part as is seen from FIG. 5B, the casting fins are expected to appear at the upstream edge 6c of partition plate 6. As is easily understood from FIG. 1, the work for cutting or removing such casting fins from the upstream edge 6c is quite easy as compared with the casting fins formed on the downstream edge 6b, because the edge 6c is just exposed to the outside of the side wall surface 5 of the produced cylinder head 1.

In view of the above-discussed matters, the following two measures A and B have been thought out by the inventor, which are depicted in FIGS. 6A-1 to 6B-3.

Measure-A (FIGS. 6A-1, 6A-2 and 6A-3)

Figure 6A:
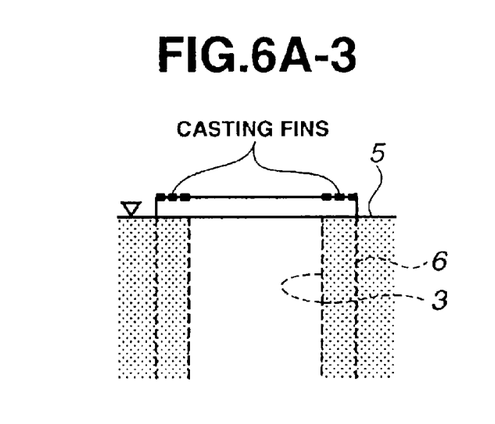
Figure 6A:
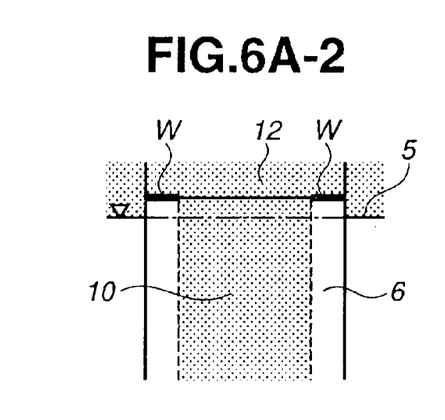
Figure 6A:
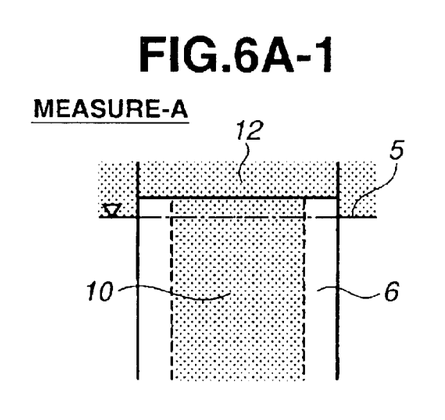
Figure 6B:
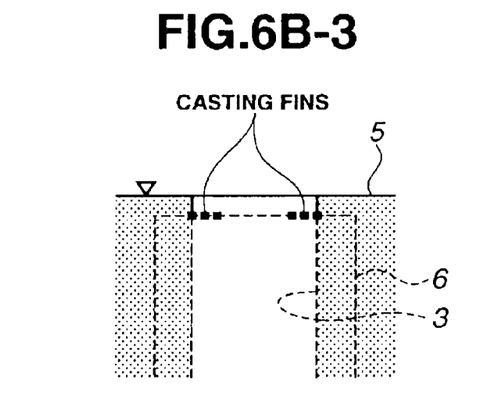

In this measure, as is seen from FIG. 6A-1, before casting a molten metal into a sand mold, the core sand 10 is set in such a certain position that the upstream edge 6c of partition plate 6 in the core sand 10 is projected outward from the side wall surface 5 of cylinder head 1 to be produced, and the projected upstream edge 6c is supported by core print 12 which has been constructed to cause the upstream part of core sand 10 to have cracks, as is seen from FIG. 6A-2. Thus, for the reasons as mentioned hereinabove, in this measure, the casting fins are formed on the upstream edge 6c of partition plate 6 as is seen from FIG. 6A-3. However, removal of such casting fins is very easy. Actually, the work for removing the casting fins is carried out together with a work for finishing the side wall surface 5 of produced cylinder head 1.

However, this measure tends to have the following shortcomings.

First, because the outwardly projected upstream edge 6c of partition plate 6 has a thinner structure extending diametrically in intake port 3 of the produced cylinder head 1, the work for removing such casting fins from the upstream edge 6c tends to deform partition plate 6. Actually, during the casting fin removing work, a marked force is applied to the outwardly projected upstream edge 6c. Particularly, in a partition plate 6 set in a core sand 10 used for producing a siamesed type intake port 3, the width is inevitably large. In this case, supporting a central portion of partition plate 6 by the fixed side edges 6a-1 and 6a-2 (see FIG. 2A) becomes poor, which increases the possibility of the deformation of partition plate 6. Of course, such deformation of partition plate 6 has a marked influence on the air intake performance of the intake port 3. Furthermore, the work for removing the casting fins is carried out while producing uncomfortable noise.

Figure 6B:
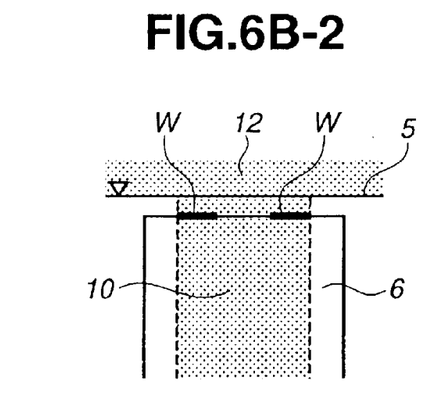
Figure 6B:
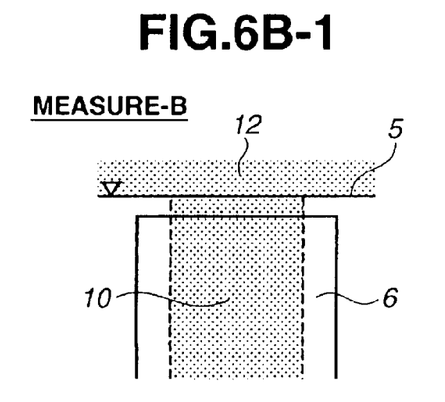

Measure-B (FIGS. 6B-1, 6B-2 and 6B-3)

In this measure, as is seen from FIG. 6B-1, before casting the molten metal to the sand mold, the core sand 10 is set in such a certain position that the upstream edge 6c of partition plate 6 in the core sand 10 is positioned inside of the side wall surface 5 of cylinder head 1 to be formed, and only the upstream end of core sand 10 is supported by core print 12 which has been constructed to cause the upstream part of core sand 10 to have cracks.

However, this measure tends to have the following shortcomings.

As is seen from FIG. 6B-3, the flush is produced on the upstream edge 6c of partition plate 6 that is positioned inside or behind the side wall surface 5 of the produced cylinder head 1. This means that the work for removing the casting fins from partition plate 6 should be made independently of the work for finishing the side wall surface 5 of the produced cylinder head 1. Of course, usage of two types of finishing work brings about a troublesome and time-consumed labor with which the cylinder head 1 is manufactured. In this connection, the measure-B is not different from the conventional measure.

If, in the measure-A or measure-B, before casting the molten metal to the sand mold, the core sand 10 is set in such a position that the upstream edge 6c of partition plate 6 is flush with the side wall surface 5 of cylinder head 1 to be formed, it may occur that about 50% of the produced cylinder heads 1 has casting fins on the upstream edge 6c of partition plate 6. In this case, a check work is additionally needed for separating the produced cylinder heads 1 into OK-group which does not need the casting fin cutting process and NO-group which needs the casting fin cutting process. This additional check work is a troublesome and time-consumed labor.

Measure of the Present Invention (FIGS. 7A-1, 7A-2 and 7A-3)

In view of the above-mentioned matters, the following unique measure has been found by the inventor, which is depicted by FIGS. 7A-1, 7A-2 and 7A-3.

In the present invention, partition plate 6 has such a shape as has been explained hereinabove with reference to FIG. 2A. That is, as is understood from FIG. 2A, partition plate 6 comprises a major portion (no numeral), lateral edges 6a-1 and 6a-2, longer downstream edge 6b and shorter upstream edge 6c. The shorter upstream edge 6c comprises major straight portion 6c-1 and two projected end portions 6c-2 and 6c-3.

In the present invention, the following production steps are taken for producing a cylinder head 1.

First, a cylindrical core sand 10 having partition plate 6 correctly set therein is prepared, which is shown in FIGS. 4A and 4B. Then, as is understood from FIG. 7A-1, the core sand 10 is set in a sand mold and positioned in such a manner that the major straight portion 6c-1 of shorter upstream edge 6c of partition plate 6 is positioned inside of the side wall surface 5 of cylinder head 1 to be produced and the two projected end portions 6c-2 and 6c-3 of shorter upstream edge 6c are projected outward from the side wall surface 5 of cylinder head 1 to be produced. The upstream part of core sand 10 is supported by a core print 12 together with the upstream edge 6c of partition plate 6. Then, a molten metal (viz., molten aluminum alloy) is poured into the sand mold. Thus, core sand 10, partition plate 6 and core print 12 are greatly heated. Due to provision of the projected end portions 6c-2 and 6c-3 of partition plate 6, cracks W tend to appear in core print 12 at positions that abut on the projected end portions 6c-2 and 6c-3, as is seen from FIG. 7A-2. After solidification of the molten metal, a produced cylinder head 1 is removed from the sand mold. For the reasons as mentioned hereinabove, the produced cylinder head 1 has such a structure as is shown in FIG. 2A. More specifically, as is seen from FIG. 7A-3, projected end portions 6c-2 and 6c-3 of partition plate 6 have casting fins formed thereon.

Figure 7A:
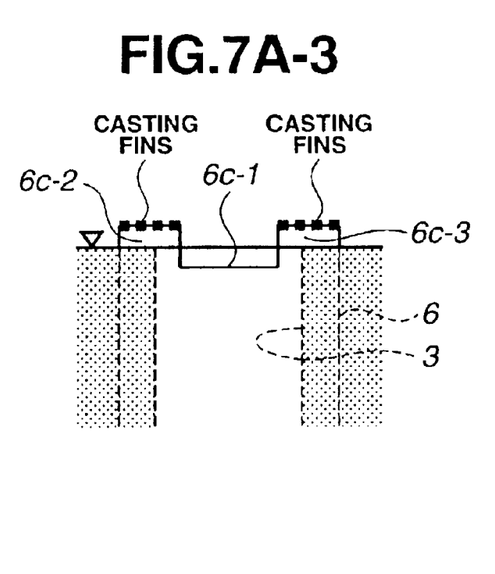
Figure 7A:
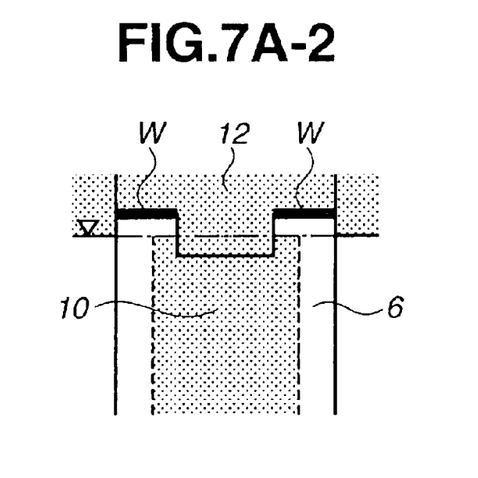
Figure 7A:
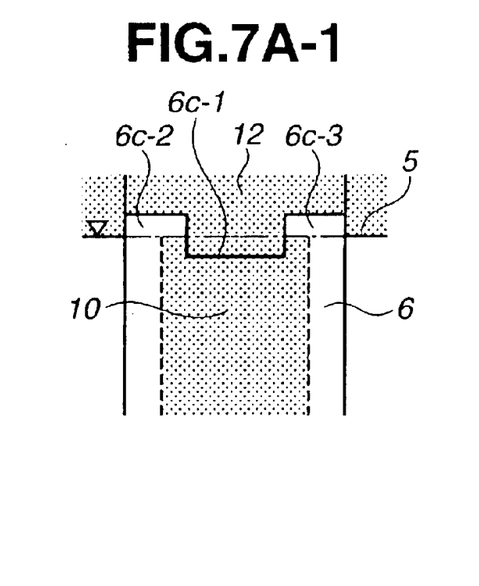
Figure 7B:
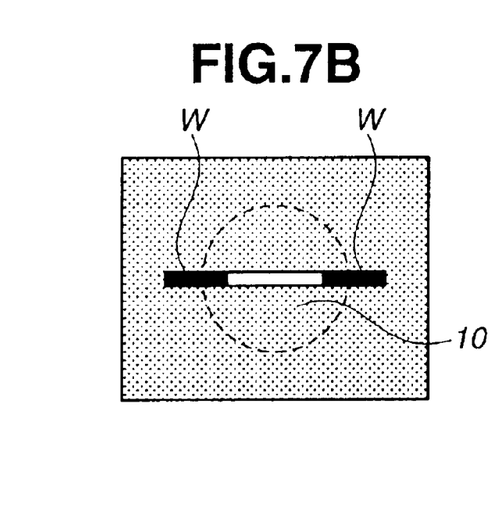

It is now to be noted that as is seen from FIG. 7A-3 and FIG. 2A, the projected end portions 6c-2 and 6c-3 of partition plate 6 installed in intake port 3 are positioned outside of or projected outward from the side wall surface 5 of the produced cylinder head 1.

Thus, a work for trimming the projected end portions 6c-2 and 6c-3 having thereon the casting fins is easily carried out. By this trimming, the upstream edges of the two projected end portions 6c-2 and 6c-3 are flush with the side wall surface 5 of the cylinder head 1. As is mentioned hereinabove, the work for removing the casting fins (viz., two projected end portions 6c-2 and 6c-3) can be carried out together with the work for finishing the side wall surface 5 of the produced cylinder head 1. That is, these two works can be made at the same time by using a common machining tool.

Furthermore, as is seen from FIGS. 2A and 2B, since the two projected portions 6c-2 and 6c-3, which are small in size, are tightly held by the cylinder head 1, the work for trimming the two projected portions 6c-2 and 6c-3 is safely carried out without applying the major portion of partition plate 6 with a marked force. Thus, undesired deformation of partition plate 6 is suppressed.

Because the corner portions of the projected end portions 6c-2 and 6c-3 are chamfered or rounded, the work for trimming the two projected end portion 6c-2 and 6c-3 is smoothly made. That is, appearance of undesired burrs which would be produced by such work is avoided.

Figure 8A:
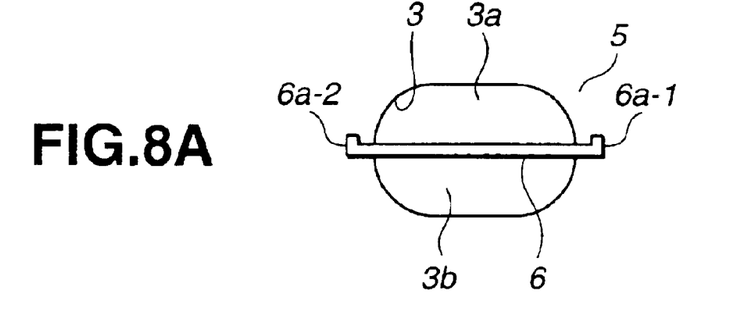
FIGS. 8A to 8E are views similar to FIG. 3, but showing various partition plates which are usable in the present invention.

Referring to FIG. 8A, there is shown another partition plate 6 usable in the present invention, of which lateral edges 6a-1 and 6a-2 are bent at right angles. With these bent edges, the lateral edges 6a-1 and 6a-2 are much strongly fixed to the cylinder head 1.

Referring to FIGS. 8B to 8E, there are shown other partition plates 6 which are also usable in the present invention. As shown, the partition plates 6 of these drawings have at least one curved or bent portion.

Figure 8B:
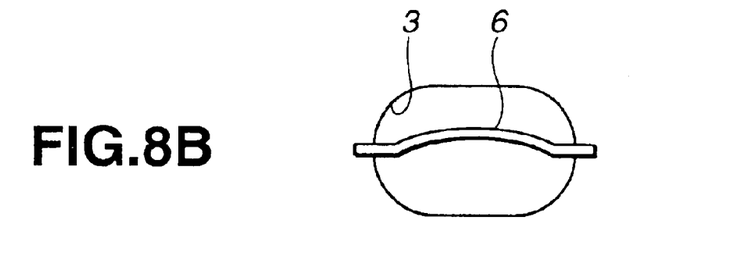
Figure 8C:
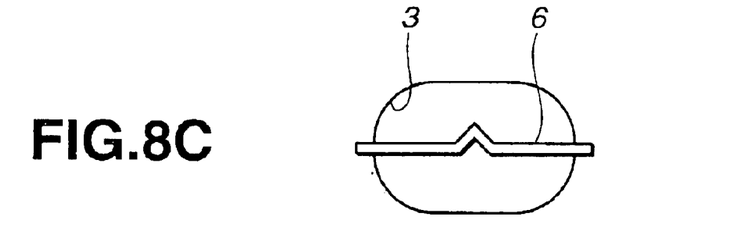
Figure 8D:
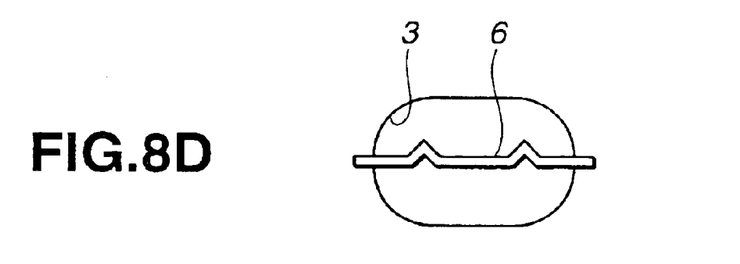
Figure 8E:
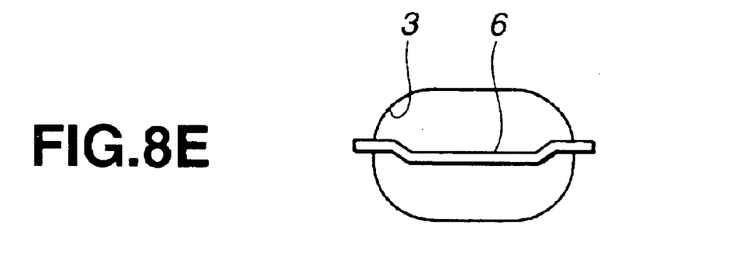

That is, partition plate 6 of FIG. 8B has a round portion, partition plate 6 of FIG. 8C has a sharply raised portion, partition plate 6 of FIG. 8D has two sharply raised portions and partition plate 6 of FIG. 8E has a depressed portion. Due to provision of such curved, bent or depression portion or portions, a thermal expansion of the partition plates 6 in lateral direction can be appropriately absorbed.

It is to be noted that in all of these partition plates 6 of FIGS. 8B to 8E, the curved or bent portion thereof is so oriented that a longitudinal axis extends along an axis of intake port 3.

The entire contents of Japanese Patent Application 2002-370766 (filed Dec. 20, 2002) are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A cylinder head of an internal combustion engine, comprising:
   a structure cast in metal, the structure defining therein an intake port and having a side wall surface from which an upstream end of the intake port is exposed to the outside; and
   a partition plate of metal installed in the intake port to divide the same into two parallel intake conduits, the partition plate having lateral edges which are embedded in an inner wall of the intake port,
   wherein the partition plate has an upstream edge which includes a major straight portion and two projected end portions which are provided on both ends of the major straight portion respectively, and
   wherein the major straight portion is positioned inside relative to the side wall surface and the two projected end portions have upstream edges which are embedded in the inner wall of the intake port and machined to be flush with the side wall surface.

2. A cylinder head as claimed in claim 1, in which the upstream edges of the two projected end portions are provided by cutting parts of the two projected end portions which are projected outward from the side wall surface.

3. A cylinder head as claimed in claim 1, in which the two projected end portions have portions chamfered or rounded.

4. A cylinder head as claimed in claim 1, in which the partition plate is set in the intake port through a casting-in technique using the partition plate as an insert.

5. A cylinder head as claimed in claim 1, in which the partition plate has a thickness ranging from approximately 1 mm to approximately 2 mm.

6. A cylinder head as claimed in claim 1, in which the partition plate is constructed of a duralumin, a stainless steel or an aluminum alloy.

7. A cylinder head as claimed in claim 1, in which the lateral edges of the partition plate are bent relative to a major portion of the partition plate.

8. A cylinder head as claimed in claim 1, in which the partition plate has a curved or bent portion which is so oriented that a longitudinal axis thereof extends along an axis of the intake port.

9. A method of producing a cast cylinder head of an internal combustion engine, the cylinder head having an intake port and a side wall surface from which an upstream end of the intake port is exposed to the outside, the method comprising:
   (a) preparing a sand core for shaping the intake port, the sand core having a partition plate set therein, the partition plate including a major portion wholly embedded in the sand core, lateral edges projected from lateral edges of the core sand, a downstream edge and an upstream edge, the upstream edge including a major straight portion and two projected end portions which are provided at both ends of the major straight portion;
   (b) setting the sand core in a sand mold in such a manner that the major straight portion is positioned inside of the side wall surface of a cylinder head to be produced and the two projected end portions are projected outward from the side wall surface of the cylinder head to be produced;
   (c) positioning the sand core relative to a core print possessed by the sand mold;
   (d) pouring a molten metal into the sand core and removing a produced cylinder head from the sand mold after solidification of the molten metal; and
   (e) trimming the two projected end portions of the partition plate in the produced cylinder head in order that upstream edges of the two projected end portions are flush with the side wall surface of the produced cylinder head.

10. A method as claimed in claim 9, in which the lateral edges of the partition plate at the step (a) are bent relative to the major portion.

11. A method as claimed in claim 9, in which the two projected end portions of the partition plate at the step (a) have portions chamfered or rounded.

12. A method as claimed in claim 9, in which the partition plate at the step (a) has at least a curved or bent portion which is so oriented that a longitudinal axis thereof extends along a longitudinal axis of the partition plate.

* * * * *